US010491786B2

(12) United States Patent
Sanford et al.

(10) Patent No.: US 10,491,786 B2
(45) Date of Patent: Nov. 26, 2019

(54) ELECTRONIC DEVICE WITH INPUT-OUTPUT COMPONENT MOUNTING STRUCTURES

(71) Applicant: Apple Inc., Cupertino, CA (US)

(72) Inventors: Emery A. Sanford, San Francisco, CA (US); David G. Havskjold, Portola Valley, CA (US); Teodor Dabov, Los Angeles, CA (US); Erik G. de Jong, San Francisco, CA (US); Tyson B. Manullang, Sunnyvale, CA (US); Anthony S. Montevirgen, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/118,276

(22) Filed: Aug. 30, 2018

(65) Prior Publication Data

US 2018/0376039 A1  Dec. 27, 2018

Related U.S. Application Data

(63) Continuation of application No. 15/388,890, filed on Dec. 22, 2016, now Pat. No. 10,070,025, which is a continuation of application No. 13/558,853, filed on Jul. 26, 2012, now Pat. No. 9,538,052.

(51) Int. Cl.
*H04N 5/225* (2006.01)

(52) U.S. Cl.
CPC ......... *H04N 5/2252* (2013.01); *H04N 5/2256* (2013.01)

(58) Field of Classification Search
None
See application file for complete search history.

(56) References Cited

U.S. PATENT DOCUMENTS

| 8,044,314 | B2 | 10/2011 | Weber et al. |
| 8,808,895 | B2 | 8/2014 | Malek et al. |
| 8,886,031 | B2 | 11/2014 | Pope et al. |
| 2003/0227564 | A1 | 12/2003 | Lim |
| 2004/0105025 | A1 | 6/2004 | Sherling |
| 2005/0219398 | A1 | 10/2005 | Sato et al. |
| 2005/0237414 | A1 | 10/2005 | Sawanobori |

(Continued)

*Primary Examiner* — Twyler L Haskins
*Assistant Examiner* — Dwight Alex C Tejano
(74) *Attorney, Agent, or Firm* — Treyz Law Group, P.C.; G. Victor Treyz; Kendall W. Abbasi

(57) ABSTRACT

An electronic device may have a housing such as a metal housing. Openings may be formed in the housing to accommodate a button, to form a camera window, to form a microphone port, and to form a camera flash window. An input-output component mounting member may be used to mount input-output components to the housing of the electronic device. The input-output component mounting member may have a recess that mates with a corresponding protrusion on the housing. Screws may attach the input-output component mounting member to the housing. The protrusion and recess in the input-output component mounting member may ensure that the input-output component mounting member is accurately aligned with respect to the housing. Input-output components such as a microphone, button switch, camera, and camera flash may be mounted to the electronic device with the input-output component mounting member.

17 Claims, 9 Drawing Sheets

(56) References Cited

U.S. PATENT DOCUMENTS

| | | |
|---|---|---|
| 2005/0253923 A1 | 11/2005 | Komori et al. |
| 2006/0268159 A1 | 11/2006 | Orimoto et al. |
| 2007/0206116 A1 | 9/2007 | Chou |
| 2008/0058010 A1 | 3/2008 | Lee |
| 2008/0143870 A1 | 6/2008 | Tanaka et al. |
| 2008/0194290 A1 | 8/2008 | Lebert et al. |
| 2008/0252777 A1 | 10/2008 | Haruyama |
| 2008/0266447 A1 | 10/2008 | Ohara et al. |
| 2009/0161005 A1 | 6/2009 | Cheng et al. |
| 2009/0201414 A1 | 8/2009 | Kinoshita |
| 2009/0219433 A1 | 9/2009 | Higuchi et al. |
| 2010/0158500 A1 | 6/2010 | Zhang |
| 2010/0309369 A1* | 12/2010 | Jarvis ................ H04N 5/2254 348/371 |
| 2011/0164365 A1 | 7/2011 | McClure et al. |
| 2011/0180557 A1 | 7/2011 | Kenney |
| 2011/0244165 A1 | 10/2011 | Hill et al. |
| 2011/0255000 A1 | 10/2011 | Weber et al. |
| 2012/0044623 A1 | 2/2012 | Rivera et al. |
| 2013/0051785 A1* | 2/2013 | Pope ................... G03B 17/02 396/535 |
| 2014/0022451 A1 | 1/2014 | Wang |
| 2014/0071337 A1 | 3/2014 | Duan et al. |
| 2015/0168807 A1 | 6/2015 | Chao |
| 2015/0381860 A1 | 12/2015 | De Nardi et al. |

* cited by examiner

ELECTRONIC DEVICE WITH INPUT-OUTPUT COMPONENT MOUNTING STRUCTURES

This application is a continuation of U.S. patent application Ser. No. 15/388,890, filed Dec. 22, 2016, which is a continuation of U.S. patent application Ser. No. 13/558,853, filed on Jul. 26, 2012, both of which are hereby incorporated by reference herein in their entireties.

BACKGROUND

This relates to electronic devices and, more particularly, to mounting structures in electronic devices for mounting input-output components.

Electronic devices such as cellular telephones and other portable devices are often provided with input-output components such as cameras, microphones, and buttons. In many devices, bulky or cumbersome mounting structures are used in mounting input-output components. This may result in electronic devices that are undesirably large, that are complex to assemble, and that exhibit mounting structure failures during use.

It would therefore be desirable to be able to provide improved electronic device mounting structures for input-output components.

SUMMARY

An electronic device may have a housing such as a metal housing. Input-output components may be mounted in the housing. For example, input-output components such as a button, a camera, a camera flash, and a microphone may be mounted within the housing.

To accommodate input-output components, openings may be formed in the housing. For example, a button opening may be formed in the housing to accommodate a button member in a button. During operation, the button member may move back and forth within the button opening and may bear against an associated button switch. As another example, the housing may have openings to form a camera window, a microphone port, and a camera flash window. A clear camera window member may be mounted in the camera window opening. A Fresnel lens or other clear structure may be mounted in the camera flash window. A mesh with openings may be used to cover the microphone port while allowing sound to reach the microphone.

An input-output component mounting member may be used to mount input-output components to the housing of the electronic device. The input-output component mounting member may have a recess that mates with a corresponding alignment features such as a protrusion on the housing, thereby helping to ensure that the input-output component mounting member is aligned with respect to the housing.

Screws may attach the input-output component mounting member to the housing. The protrusion and recess in the input-output component mounting member may ensure that the input-output component mounting member is accurately aligned with respect to the housing. Input-output components such as a microphone, button switch, camera, and camera flash may be mounted to the electronic device with the input-output component mounting member in respective alignment with the microphone port, button opening, camera window, and camera flash window in the electronic device housing.

A camera window trim structure that is associated with the camera window may be attached to the housing using a threaded nut or using a welded attachment plate.

Further features of the invention, its nature and various advantages will be more apparent from the accompanying drawings and the following detailed description of the preferred embodiments.

DETAILED DESCRIPTION

Electronic devices may be provided with input-output components such as audio components (e.g., microphones and speakers), buttons, sensors, imaging equipment (e.g., a camera and flash), and other components. Bracket structures and other input-output component mounting structures may be used in compactly and accurately mounting these input-output components within an electronic device.

Figure 1:
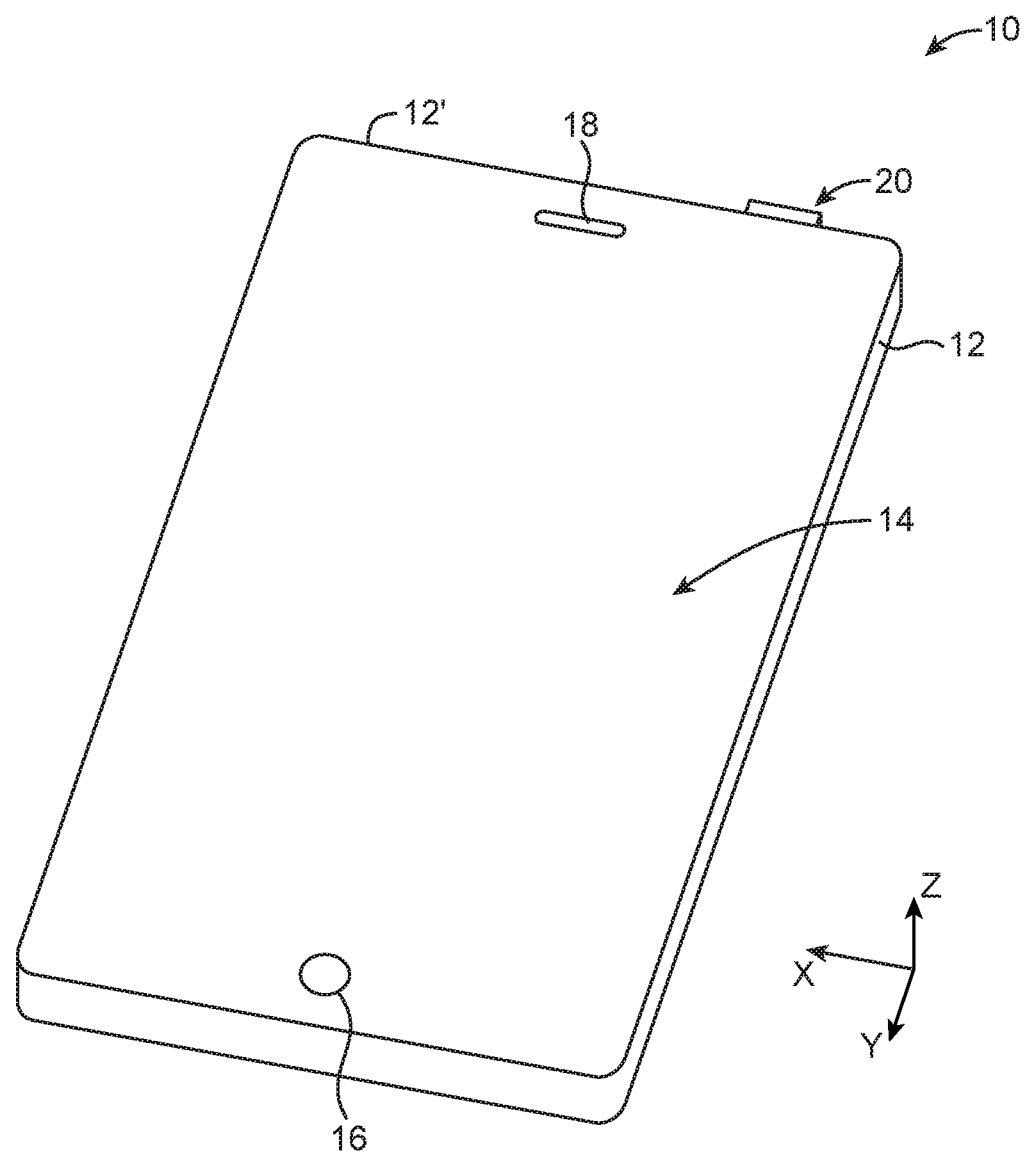
FIG. 1 is a front perspective view of an illustrative electronic device with input-output component mounting structures in accordance with an embodiment of the present invention.

An illustrative electronic device of the type that may be provided with input-output component mounting structures is shown in FIG. 1. Device 10 of FIG. 1 may be a handheld device such as a cellular telephone or media player, a tablet computer, a notebook computer, other portable computing equipment, a wearable or miniature device such as a wristwatch or pendant device, a television, a computer monitor, or other electronic equipment.

As shown in FIG. 1, electronic device 10 may have a front face that includes a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16 and an opening such as opening 18 may be used to form a speaker port. Device configurations without openings in display 14 may also be used for device 10.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have openings to form input-output ports (e.g., audio ports, digital signal ports, etc.). Housing 12 may also have one or more openings to accommodate buttons and other input-output components. As an example, housing 12 may have an opening along upper edge 12' to accommodate a button such as button 20.

Figure 2:
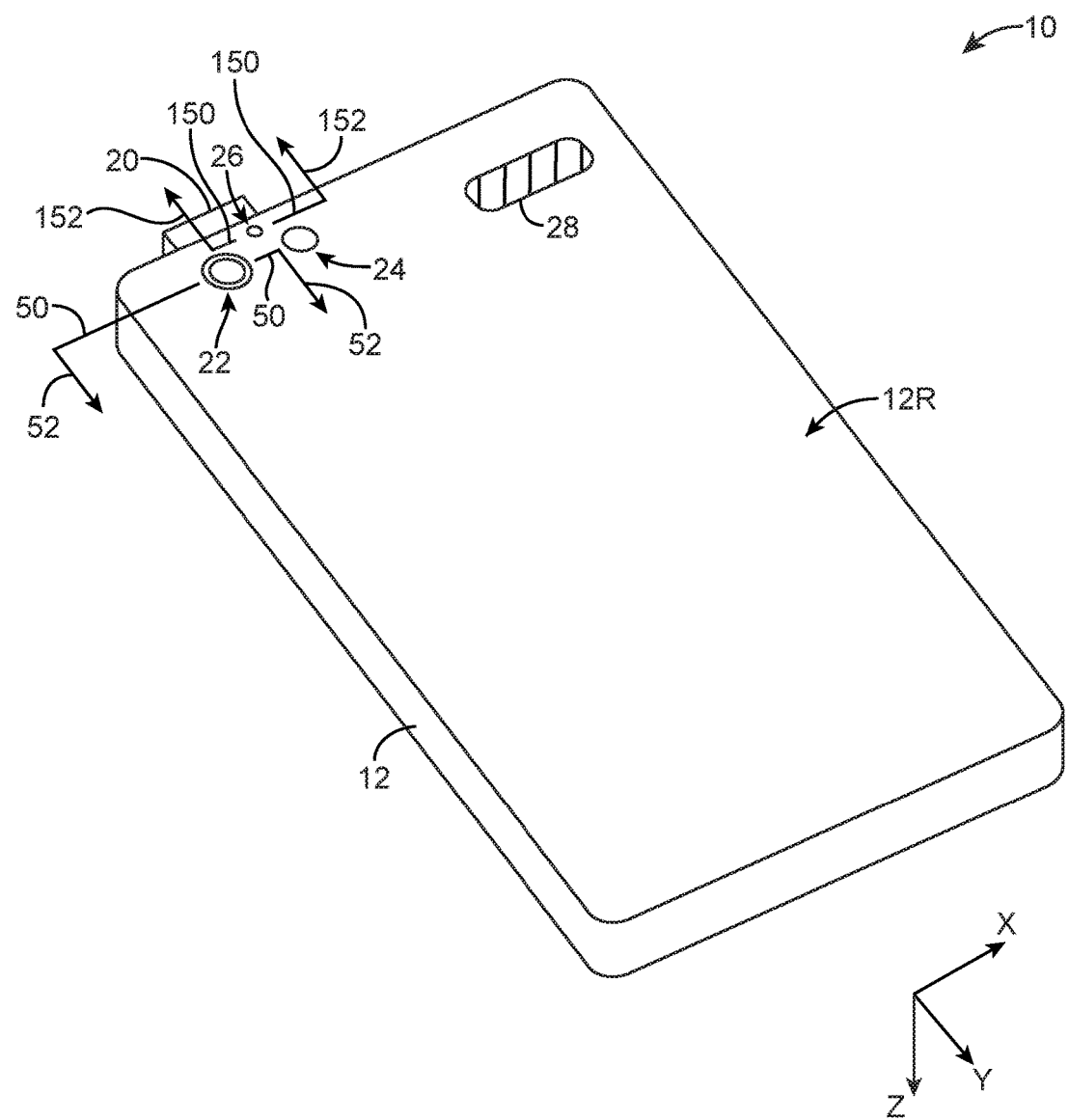
FIG. 2 is a rear perspective view of the illustrative electronic device of FIG. 1 in accordance with an embodiment of the present invention.

A rear perspective view of device 10 of FIG. 1 is shown in FIG. 2. As shown in FIG. 2, housing 12 may have a rear surface such as surface 12R. Rear surface 12R may be a planar surface formed from metal, glass, polymer, ceramic, or other materials. The peripheral portions of rear surface 12R may form vertical sidewalls (i.e., sidewalls having surfaces that run perpendicular to the central portion of rear planar surface 12R) or may be curved (e.g., to form rounded edges for device 10). The rear housing wall of device 10 may be formed from a structure that is separate from the sidewalls of housing 12 or the rear surface of housing 12 and all or some of the sidewalls of housing 12 may be formed from integral housing structures.

Openings may be formed in housing 12. For example, rear housing wall 12R may have an opening for a camera window such as camera window 22, an opening for a camera flash window (sometimes referred to as a camera strobe window) such as camera flash window 24, and an opening for forming a microphone port such as microphone port 26. Housing 12 may also have one or more antenna window structures. As an example, housing 12 may be formed from a conductive material such as metal and rear surface 12R may have an opening in which a dielectric antenna window structure is formed such as antenna window structure 28 of FIG. 2.

Figure 3:
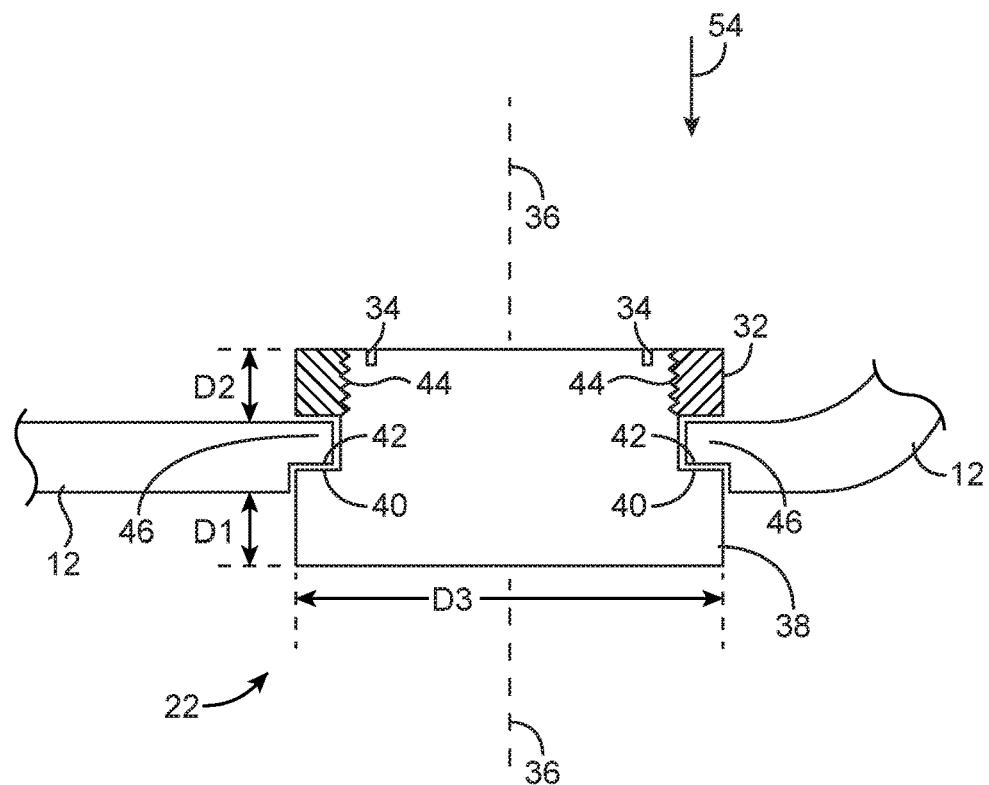
FIG. 3 is a cross-sectional side view of an illustrative camera window structure that may be used in an electronic device of the type shown in FIGS. 1 and 2 in accordance with an embodiment of the present invention.

Camera window 22 may include a transparent camera window member such as a clear glass or plastic disk (sometimes referred to as a camera lens) and trim structures for mounting the transparent camera window disk to device 10. A cross-sectional side view of illustrative camera trim structures of the type that may be used in mounting a transparent camera window member to housing 12 is shown in FIG. 3. The cross-sectional side view of FIG. 3 is taken along line 50 of FIG. 2 and viewed in direction 52. With the configuration shown in FIG. 3, camera trim structures 22 include camera trim member 38 and threaded nut 32. Camera trim member 38 may have a cylindrical shape with a concentric cylindrical bore that extends along longitudinal axis 36. A transparent camera window disk may be mounted within the camera window structures so as to cover the opening of camera window trim member 38.

Threaded nut 32 may be screwed onto threads 44 on member 38. Member 38 may have engagement features such as holes 34 that may be engaged by a mating tool. This allows the tool to hold member 38 in place and prevent rotation of member 38 about axis 36 when screwing threaded nut 32 onto threads 44.

Camera window trim member 38 may have a circular ledge portion such as ledge 40 that extends around the circular periphery of camera window trim member 38. Electronic device housing 12 may have a corresponding portion such as ledge 42. When threaded nut 32 is screwed onto the threaded portion of member 38, ledge 40 of member 38 may be pressed against ledge 42 of housing 12. Portions 46 of housing 12 may therefore be compressed between threaded nut 32 and ledge portion 40 of member 38, securing camera window structures 22 in place on housing 12.

Structures 22 in a configuration of the type shown in FIG. 3 may be characterized by a portion of member 38 that protrudes a distance D1 above the exterior surface of housing 12 and a thickness D2 for nut 32. The magnitude of D1 may be, for example, 0.6 mm, 0.3 mm to 0.9 mm, or other suitable size. The magnitude of D2 may be, for example, 0.2 mm, 0.1 to 0.3 mm, or other suitable size. The diameter D3 of member 38 may be, for example 0.5 to 10 mm or other suitable size.

Figure 4:
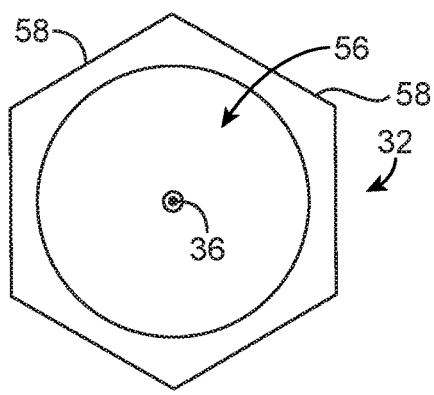
FIG. 4 is a top view of an illustrative nut for attaching a camera trim member of the type shown in FIG. 3 to an electronic device housing in accordance with an embodiment of the present invention.

FIG. 4 is a top view of threaded nut 32 of FIG. 3 as viewed in direction 54 of FIG. 3. FIG. 4 shows how threaded nut 32 may have a circular opening such as opening 56 to receive threads 44 on the cylindrical upper portion of member 38 of FIG. 3. Threaded nut 32 may have flat edges such as edges 58 that allow nut 32 to be screwed onto member 38 using a wrench or other tool. The use of threaded nut 32 to secure trim member 38 to housing 12 may provide a robust camera window trim structure that is resistant to dislodgement during impact events. Structures such as nut 32 and member 38 may be formed from metal or other suitable materials.

Figure 5:
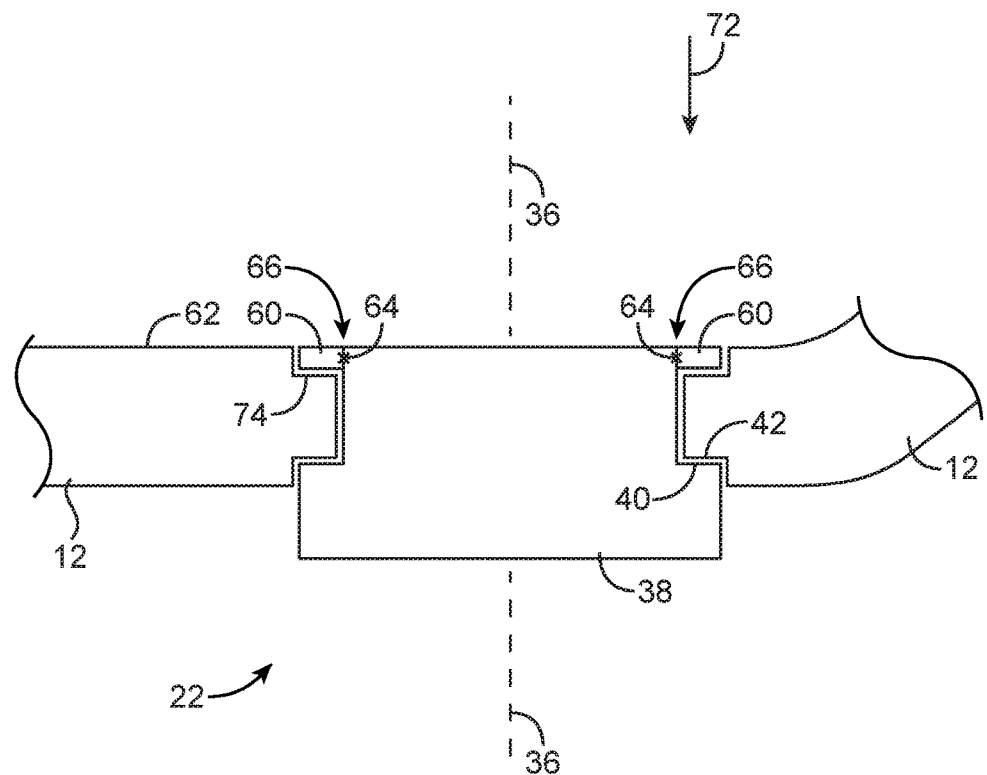
FIG. 5 is a cross-sectional side view of another illustrative camera window structure that may be used in an electronic device of the type shown in FIGS. 1 and 2 in accordance with an embodiment of the present invention.
Figure 6:
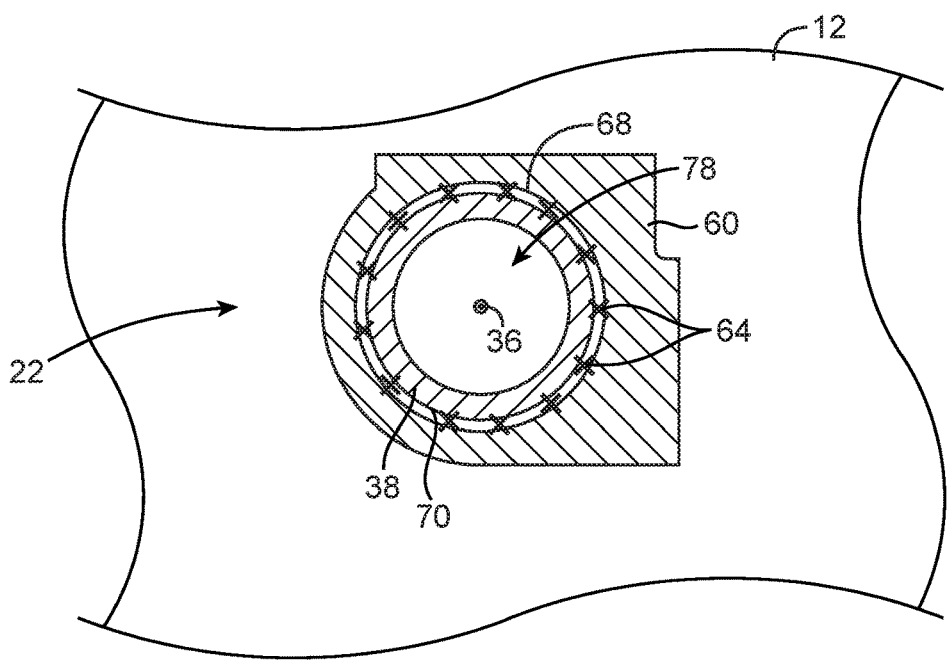
FIG. 6 is a top view of the illustrative camera window structure of FIG. 5 in accordance with an embodiment of the present invention.

If desired, camera trim structures 22 may use a welded member to attach trim member 38 to housing 12. This type of arrangement is shown in FIGS. 5 and 6. FIG. 5 is a cross-sectional side view of camera trim structures 22 of FIG. 3 as taken along line 50 of FIG. 2 and viewed in direction 52. As shown in FIG. 5, camera trim structures 22 may use an attachment member such as metal attachment plate 60 to mount camera trim member 38 to housing 12. As with the illustrative configuration of FIG. 3, camera trim member 38 of FIG. 5 may have a shape such as a cylindrical shape with a cylindrical bore that extends along longitudinal axis 36. A transparent camera window disk or other transparent camera window member may be mounted within the opening of camera trim member 38, thereby allowing light from an image to enter a camera mounted in the interior of device 10.

Attachment plate 60 may be attached to camera trim member 38 along seam 66 using attachment structures such as welds 64. Welds 64 may be formed using laser welding or other welding techniques. Housing 12 may have a recess such as recess 74 for receiving plate 60. Recess 74 may help ensure that plate 60 does not protrude above inner surface 62 of housing 12 and may help prevent plate 60 and member 38 from rotating about axis 36.

FIG. 6 is a top view of camera window structures 22 of FIG. 5 when viewed in direction 72. As shown in FIG. 6, attachment plate 60 may be rotationally asymmetric with respect to longitudinal axis 36 of member 38. FIG. 6 shows how attachment plate 60 may have a circular opening such as opening 78 to receive a corresponding cylindrical portion of member 38 of FIG. 5. Attachment plate 60 may have an inner surface 68 that is separated from outer surface 70 of member 38 by an air gap running along seam 66 (FIG. 5). The width of the air gap separating inner surface 68 of plate 60 from outer surface 70 of member 38 may be 0.05 mm, 0.02 to 0.08 mm, or other suitable size that allows satisfactory formation of welds 64. The peripheral edge of plate 60 may have curved portions, straight portions, and, if desired, may have a combination of curved and straight portions, as shown in FIG. 6.

Figure 7:
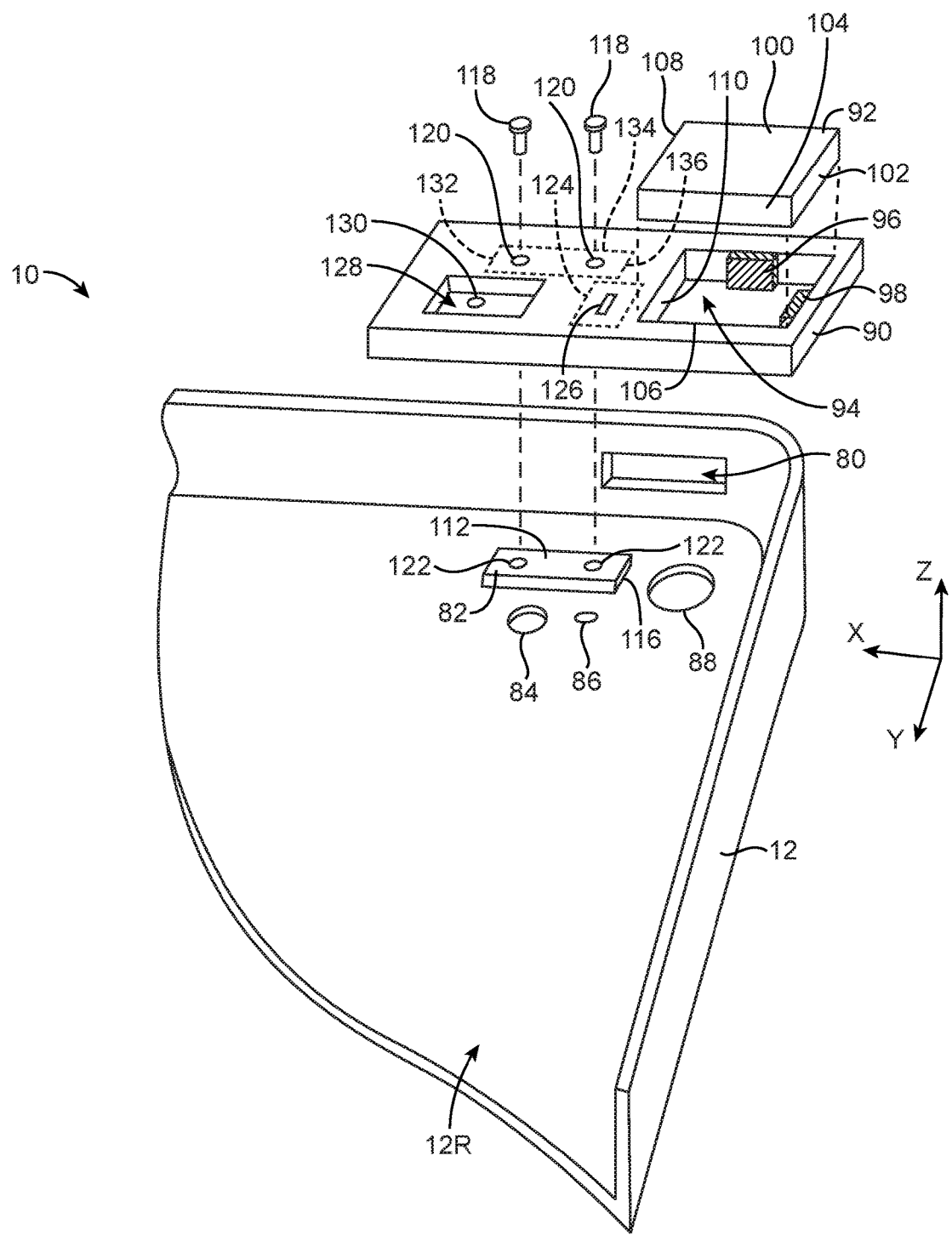
FIG. 7 is an exploded perspective view of an interior portion of an electronic device with input-output component mounting structures in accordance with an embodiment of the present invention.

FIG. 7 is an exploded perspective view of device 10 in the vicinity of the corner of housing 12 that contains button 20. Button 20 (not shown in FIG. 7) may be formed from a button member that protrudes through button opening 80 of housing 12. Housing 12 may have openings in rear surface 12R such as openings 84, 86, and 88. Opening 88 may be used to accommodate camera trim structures 22 and may be used in forming camera window 22 of FIG. 2. Opening 86 may be used to form microphone port 26 of FIG. 2. Opening 84 may be used to form camera flash window 24 of FIG. 2.

Input-output component mounting structures such as input-output component mounting member 90 may be used in mounting components such as camera 92 and other input-output components within device 10. Mounting member 90 may have a partial or full recess such as opening 94 for receiving camera 92. Camera 92 may include a digital imaging device such as a silicon image sensor and associated lens structures. During operation, light from an image may be received by camera 92 through camera window opening 88.

When assembled, camera 92 may be received within opening 94, so that biasing structures 96 and 98 press against respective surfaces 100 and 102 of camera 92. Biasing structures 96 and 98 may be formed from springs, foam, or other biasing structures. When camera 92 is biased along dimension "Y" using structures 96, surface 104 of camera 92 may bear against opposing planar surface 106 of opening 94. When camera 92 is biased along dimension "X" using structures 98, surface 108 of camera 92 may bear against planar surface 110 of member 90. Using this type of arrangement, the position of camera 92 within member 90 may be accurately controlled by accurately forming surfaces 110 and 106.

The position of camera 92 relative to housing 12 and opening 88 may be accurately controlled by accurately controlling the placement of member 90 with respect to housing 12 using an alignment feature. Alignment between member 90 and housing 12 may be achieved using surfaces on housing protrusion 82 such as Y-datum surface 112 and X-datum surface 116 or other surfaces. Surfaces 112 and 116 may be oriented at right angles to each other or may otherwise be configured so as not to be coplanar, thereby supporting alignment for multiple dimensions such as dimensions X and Y. Surfaces 112 and 116 may be machined using the same machining tool (e.g., the same computer numerical control machine tool) that is used in machining housing 12 into the shape shown in FIG. 7, thereby ensuring that the position of surfaces 112 and 116 is accurate relative to the positions of the walls of housing 12, openings 84, 86, and 88, and other housing features. The upper surface of protrusion 82 may serve as a Z reference.

The underside of member 90 may have an opening such as opening 132 that receives protrusion 82. Surfaces 134 and 136 in the opening may bear against surfaces 112 and 116 of protrusion 82, respectively. By ensuring that member 90 bears against surface 112 and is therefore aligned with respect to surface 112, the position of member 90 along dimension Y becomes fixed. By ensuring that member 90 bears against surface 116 and is therefore aligned with surface 116, the position of member 90 with respect to dimension X becomes known. If desired, other reference features may be used in accurately establishing the position of member 90 with respect to housing 12 (e.g., by using the upper surface of protrusion 82 and the mating lower surface of opening 132 of member 90 to establish the position of member 90 with respect to dimension Z). The use of reference surfaces 112 and 116 on housing protrusion 82 is merely illustrative.

Member 90 may be secured to housing 12 using fasteners such as screws 118 or other attachment mechanisms. Screws 118 may pass through openings 120 in member 90 and may be screwed into threaded holes 122 in protrusion 82 of housing 12.

Member 90 may have an opening such as opening 124 on the underside of member 90 for receiving a microphone. Inspection hole 126 may be used to allow the microphone to be viewed from above. When assembled, the microphone may receive sound from the exterior of device 10 through microphone port 86 in housing 12.

Member 90 may have a recess such as camera flash recess 128 for receiving a light source such as a light-emitting diode or other light-emitting component that serves as a camera flash for camera 92. Opening 130 may allow light from the camera flash to pass through a camera flash window member mounted in opening 84.

Figure 8:
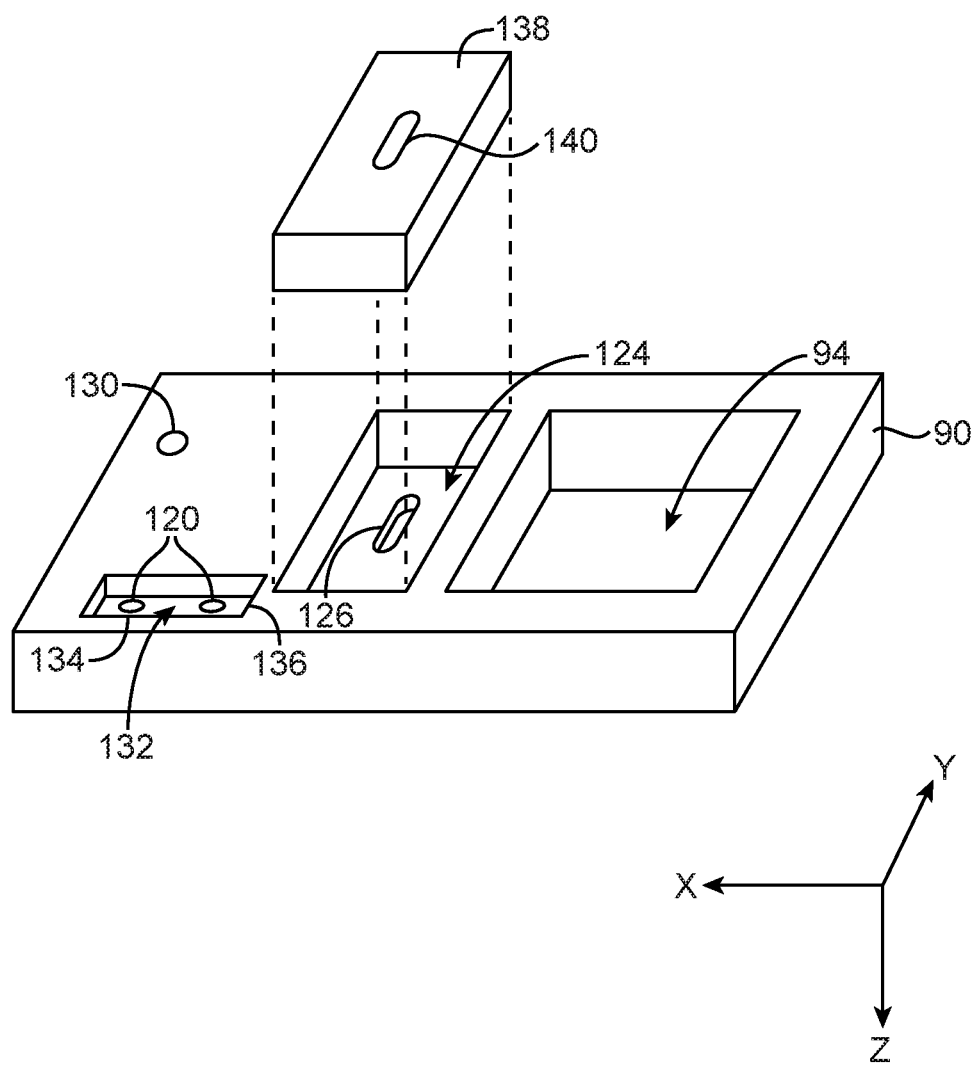
FIG. 8 is an exploded perspective view of illustrative input-output component mounting structures and an associated component such as an audio component in accordance with an embodiment of the present invention.

FIG. 8 is an exploded perspective view of member 90 and an associated audio component such as microphone 138. Microphone 138 may be mounted within microphone recess 124 in member 90. During operation of device 10, sound may pass from the exterior of device 10 to input 140 of microphone 138 via microphone opening 86 in housing 12. Light from the camera flash may pass through opening 130 of member 90 and opening 84 of housing 12 to the exterior of device 10.

Figure 9:
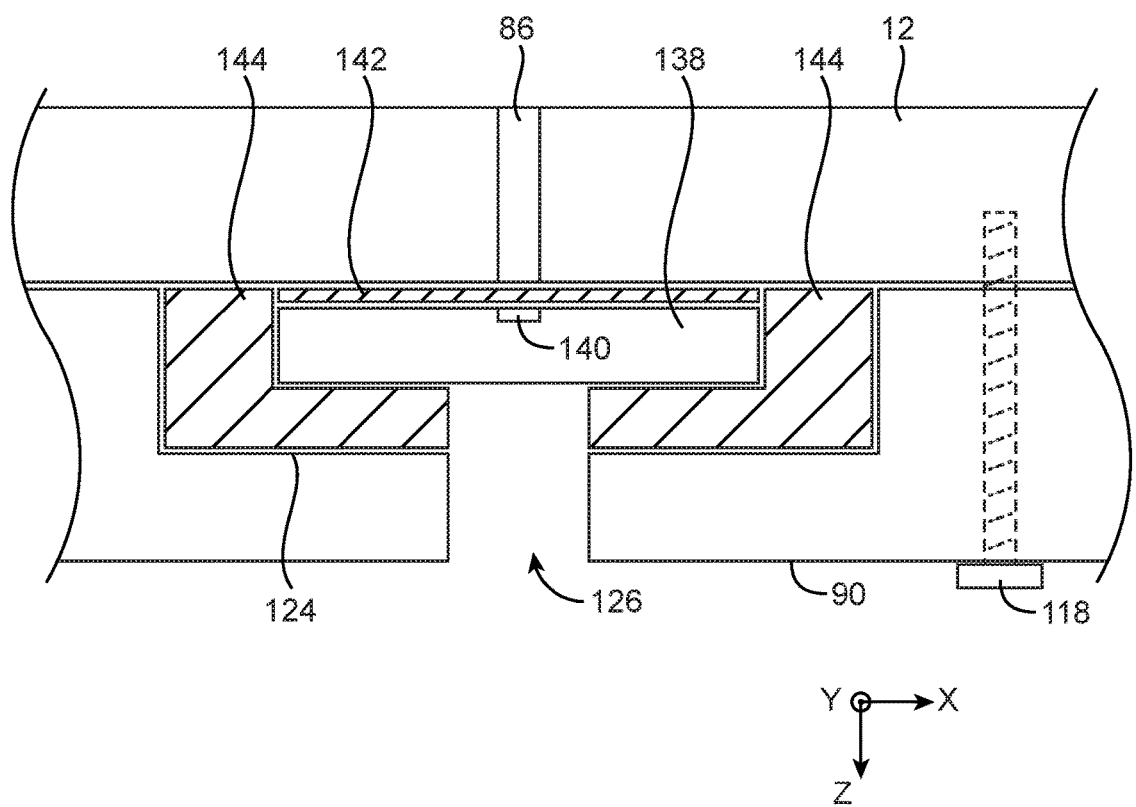
FIG. 9 is a cross-sectional side view of an illustrative audio component such as a microphone mounted in a portion of an electronic device in accordance with an embodiment of the present invention.

FIG. 9 is a cross-sectional side view of member 90 and housing 12 taken along line 150 of FIG. 2 and viewed in direction 152. As shown in FIG. 9, a sealing structure such as elastomeric microphone boot 144 may be used to mount microphone 138 to housing 12. Mesh 142 may have an array of openings that allow sound to reach microphone input 140 from microphone port 86 in housing 12. Mesh 142 may be formed from metal, plastic, other materials, or multiple mesh layers. Screw 118 may be used to mount member 190 to housing 12 so that input 140 is in alignment with microphone port 86 as shown in FIG. 9. Other types of mounting arrangements may be used if desired. The mounting configuration of FIG. 9 is merely illustrative.

Figure 10:
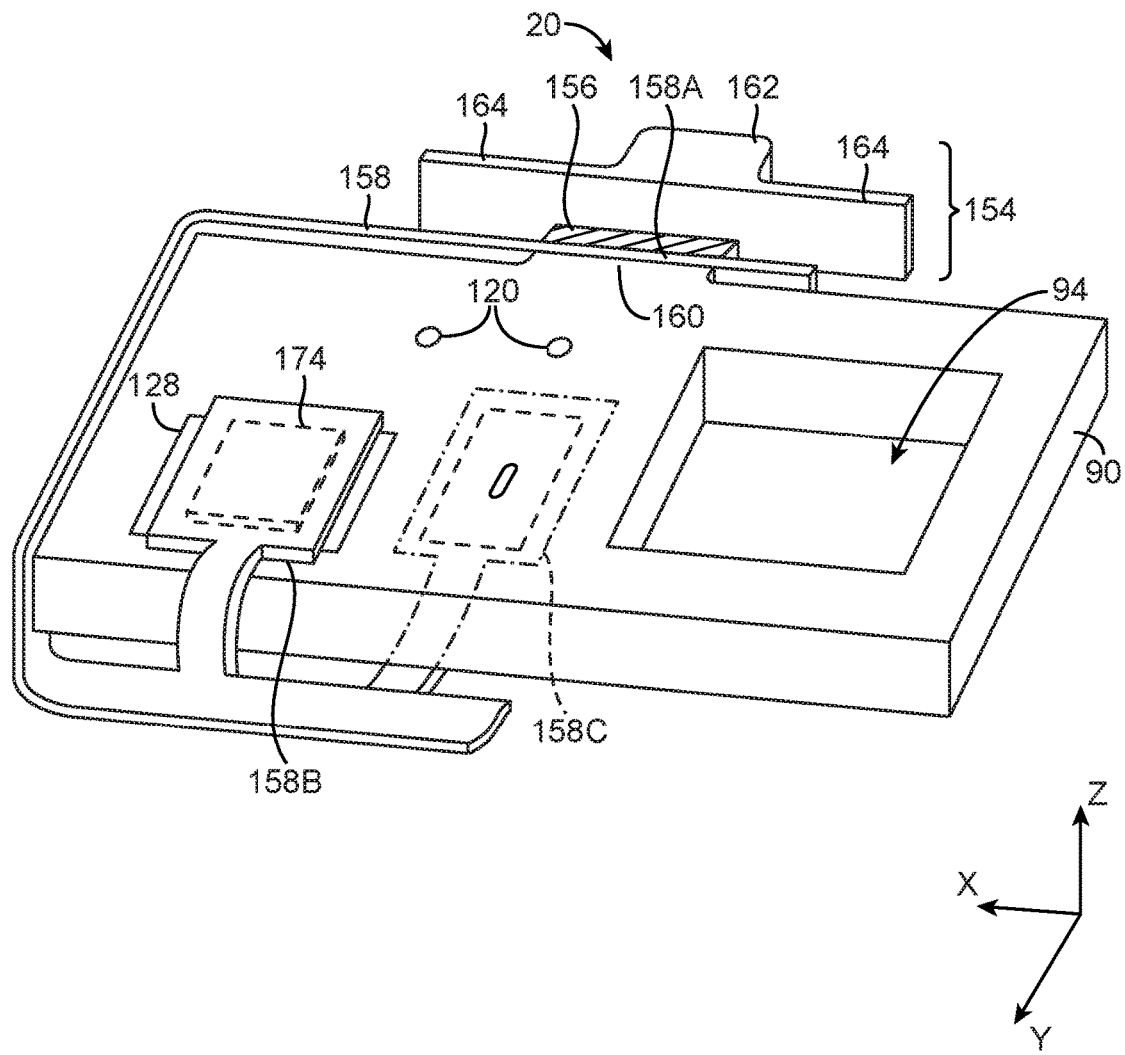
FIG. 10 is a perspective view of illustrative input-output component mounting structures to which a microphone, camera flash, and button have been mounted in accordance with an embodiment of the present invention.

FIG. 10 is perspective view of member 90 in a configuration in which input-output components have been mounted to member 90 using a flexible printed circuit substrate such as flexible printed circuit substrate 158. Flexible printed circuit substrate 158 may be formed from a flexible layer of polymer such as a sheet of polyimide. Input-output components may be attached to flexible printed circuit substrate 158 using solder, conductive adhesive, connectors, or other attachment mechanisms.

As shown in FIG. 10, flexible printed circuit substrate 158 may have a portion such as portion 158A on which a component such as button switch 156 is formed. Button switch 156 and flexible printed circuit substrate portion 158A may be mounted to protruding portion 160 of member 90 using adhesive or other suitable attachment mechanisms. Button 20 may be formed from switch 156 and an associated button member such as button member 154. When assembled in a completed device, button member portion 162 of button member 154 may protrude through opening 80 (FIG. 7) of housing 12, so that button 20 may be controlled by a user of device 10. Extending portions 164 of button member 154 may help retain button member 154 within housing 12. Switch 156 may have two or more states such as open and closed states. For example, when button member 154 is in its outermost (unpressed) position, switch 156 may be in one state (e.g., the open state) and when button member 154 is in its innermost (pressed) position, switch 156 may be in another state (e.g., the closed state).

Flexible printed circuit 158 may have a portion such as portion 158B for mounting a camera flash component such as light-emitting diode camera flash 174 within camera flash recess 128. Flexible printed circuit 158 may also have a portion such as portion 158C for mounting an input-output component such as microphone 138 (FIG. 9) within microphone recess 124. Metal traces on flexible printed circuit 158 may be coupled to camera flash 174, microphone 138, and button switch 156. If desired, wires, metal traces on molded plastic carriers, or other conductive paths may be used in routing signals to and from input-output components. The use of flexible printed circuit 158 to route signals to and from the components that are attached to member 90 is merely illustrative.

Figure 11:
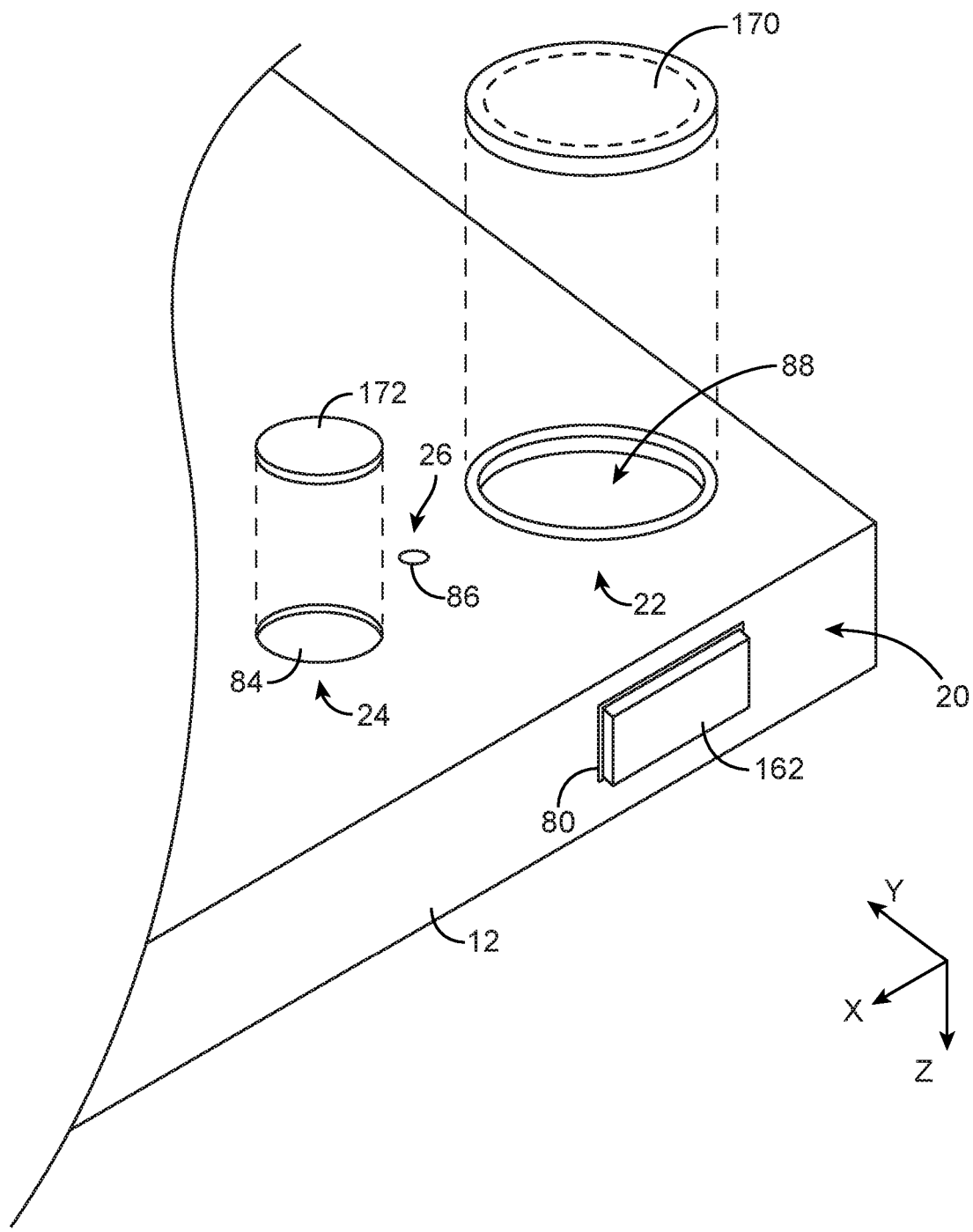
FIG. 11 is an exploded perspective view of a rear corner portion of an electronic device of the type shown in FIGS. 1 and 2 showing how a camera window and camera flash lens may be mounted within openings in an electronic device housing in accordance with an embodiment of the present invention.

FIG. 11 is a perspective view of a corner portion of electronic device 10 in the vicinity of button 20. As shown in FIG. 11, button member portion 162 of button 20 may protrude through button opening 80 in housing 12. A transparent camera window member such as window member 170 may be mounted in camera window opening 88 for forming camera window 22. A transparent flash window member such as Fresnel lens 172 may be mounted in camera flash window opening 84 for forming camera flash window 24.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a touch-sensitive display;
   a layer of glass overlapping the touch-sensitive display, wherein the layer of glass has first and second windows;
   a component mounting structure attached to the layer of glass;
   a light sensor and a light emitter mounted to the component mounting structure, wherein the component mounting structure aligns the light sensor and the light emitter respectively with the first and second windows; and
   an audio component mounted to the component mounting structure.

2. The electronic device defined in claim 1 further comprising a protrusion extending from the layer of glass, wherein the protrusion aligns the component mounting structure with respect to the first and second windows.

3. The electronic device defined in claim 2 wherein the light sensor comprises a camera and the light emitter comprises a light-emitting diode.

4. The electronic device defined in claim 1 further comprising a flexible printed circuit coupled to the light emitter.

5. The electronic device defined in claim 1 wherein the component mounting structure has a recess.

6. The electronic device defined in claim 1 wherein the audio component comprises a microphone.

7. The electronic device defined in claim 6 wherein the layer of glass has an opening.

8. The electronic device defined in claim 7 wherein the component mounting structure aligns the microphone with the opening.

9. The electronic device defined in claim 8 wherein the opening is adjacent to the first and second windows.

10. An electronic device, comprising:
    a housing having a rear housing wall;
    a display mounted in the housing;
    a bracket attached to the rear housing wall;
    a camera mounted to the bracket and aligned with a first window;
    a light-emitting diode mounted to the bracket and aligned with a second window; and
    a protrusion that aligns the bracket with respect to the housing.

11. The electronic device defined in claim 10 wherein the rear housing wall comprises glass.

12. The electronic device defined in claim 10 wherein the display comprises a capacitive touch sensor and a glass cover layer.

13. The electronic device defined in claim 10 wherein the bracket has an opening that receives the protrusion.

14. An electronic device, comprising:
    a first layer of glass having first and second windows;
    a second layer of glass;
    a display interposed between the first and second layers of glass;
    a mounting member interposed between the first and second layers of glass;
    first and second optical components mounted to the mounting member, wherein the mounting member aligns the first and second optical components with the first and second windows; and
    an audio component mounted to the mounting member.

15. The electronic device defined in claim 14 wherein the first optical component comprises a camera and the second optical component comprises a light-emitting diode.

16. The electronic device defined in claim 14 wherein the display comprises a capacitive touch sensor.

17. The electronic device defined in claim 14 wherein the audio component comprises a microphone.

\* \* \* \* \*